US010519357B2

(12) United States Patent
Amanullah

(10) Patent No.: US 10,519,357 B2
(45) Date of Patent: *Dec. 31, 2019

(54) FLAKY DATE FRUIT CAP FOR MODERATE TO SEVERE LOSS CONTROL

(71) Applicant: Saudi Arabian Oil Company, Dhahran (SA)

(72) Inventor: Md Amanullah, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 15/908,877

(22) Filed: Mar. 1, 2018

(65) Prior Publication Data

US 2018/0187061 A1 Jul. 5, 2018

Related U.S. Application Data

(62) Division of application No. 15/436,116, filed on Feb. 17, 2017.

(Continued)

(51) Int. Cl.
C09K 8/035 (2006.01)
C09K 8/514 (2006.01)
C09K 8/08 (2006.01)

(52) U.S. Cl.
CPC ............... C09K 8/035 (2013.01); C09K 8/08 (2013.01); C09K 8/514 (2013.01); C09K 2208/04 (2013.01)

(58) Field of Classification Search
CPC . C09K 8/035; C09K 8/08; C09K 8/48; C09K 8/487; C09K 8/514; C09K 8/516; C09K 2208/04; A23N 4/00; A23N 4/08
See application file for complete search history.

(56) References Cited

U.S. PATENT DOCUMENTS 2,483,936 A 10/1949 Roberts
2,600,404 A 6/1952 Hoeppel
(Continued)

FOREIGN PATENT DOCUMENTS

CN 101311243 A 11/2008
CN 101560084 A 10/2009
(Continued)

OTHER PUBLICATIONS

International Search Report and Written Opinion for International Application No. PCT/US2017/067179 International Filing Date Dec. 19, 2017; Report dated Feb. 21, 2018; pp. 1-14.
(Continued)

Primary Examiner — Frances Tischler
(74) Attorney, Agent, or Firm — Bracewell LLP; Constance G. Rhebergen; Brian H. Tompkins

(57) ABSTRACT

A lost circulation material (LCM) having date fruit caps is provided. The date fruit cap LCM includes date fruit caps from a date tree. The date fruit caps have multiple flakes (for example, three flakes) attached at one end to an end cap and free at the other end. The date fruit caps may be obtained from the waste product of date tree and date fruit processing. The date fruit cap LCM may be added to a drilling fluid (for example, a drilling mud) to mitigate or prevent such lost circulation in a well. Methods of lost circulation control with the date fruit cap LCM are also provided.

2 Claims, 3 Drawing Sheets

Related U.S. Application Data

(60) Provisional application No. 62/356,858, filed on Jun. 30, 2016.

(56) References Cited

U.S. PATENT DOCUMENTS

| | | |
|---|---|---|
| 2,749,308 A | 6/1956 | Beckum et al. |
| 2,779,417 A | 1/1957 | Clark, Jr. et al. |
| 2,789,948 A | 4/1957 | Tronolone |
| 2,811,488 A | 10/1957 | Nestle et al. |
| 2,912,380 A | 11/1959 | Groves |
| 2,943,679 A | 7/1960 | Scott, Jr. |
| 2,943,680 A | 7/1960 | Scott et al. |
| 3,147,127 A | 9/1964 | Shannon |
| 4,086,098 A | 4/1978 | Le Ruyet et al. |
| 4,110,225 A | 8/1978 | Cagle |
| 4,127,548 A | 11/1978 | Alexander |
| 4,275,788 A | 6/1981 | Sweatman |
| 4,619,772 A | 10/1986 | Black et al. |
| 5,004,553 A | 4/1991 | House et al. |
| 5,118,664 A | 6/1992 | Burts, Jr. |
| 5,197,324 A | 3/1993 | Keys |
| 5,332,724 A | 7/1994 | Burts, Jr. |
| 5,484,028 A | 1/1996 | Rose |
| 5,501,275 A | 3/1996 | Card et al. |
| 5,801,127 A | 9/1998 | Duhon, Sr. |
| 6,016,879 A * | 1/2000 | Burts, Jr. ............... C09K 8/035 166/295 |
| 6,098,712 A | 8/2000 | Burts, Jr. |
| 6,102,121 A | 8/2000 | Burts, Jr. |
| 6,271,001 B1 | 8/2001 | Clarke et al. |
| 6,350,594 B1 | 2/2002 | Clarke et al. |
| 6,518,224 B2 | 2/2003 | Wood |
| 6,716,798 B1 | 4/2004 | Burts, Jr. |
| 6,750,179 B1 | 6/2004 | Burts, Jr. |
| 6,790,812 B2 | 9/2004 | Halliday |
| 6,806,232 B1 | 10/2004 | Cart |
| 6,814,798 B2 | 11/2004 | Vijn et al. |
| 6,861,392 B2 | 3/2005 | Shaarpour |
| 6,932,158 B2 | 8/2005 | Burts |
| 7,226,895 B2 | 6/2007 | Xiang |
| 7,271,131 B2 | 9/2007 | Halliday et al. |
| 7,284,611 B2 | 10/2007 | Reddy et al. |
| 7,297,662 B2 | 11/2007 | Verret |
| 7,297,663 B1 | 11/2007 | Kilchrist et al. |
| 7,332,026 B2 | 2/2008 | Fyten et al. |
| 7,488,705 B2 | 2/2009 | Reddy et al. |
| 7,507,692 B2 | 3/2009 | Xiang |
| 7,537,054 B2 | 5/2009 | Reddy et al. |
| 7,629,297 B2 | 12/2009 | Shaarpour |
| 7,744,689 B2 | 6/2010 | Hojaji et al. |
| 7,902,126 B1 | 3/2011 | Burts, Jr. |
| 7,923,413 B2 | 4/2011 | Ghassemzadeh |
| 7,964,537 B2 | 6/2011 | Rayborn, Sr. et al. |
| 8,371,381 B2 | 2/2013 | Shindgikar et al. |
| 8,383,558 B2 | 2/2013 | Reddy et al. |
| 8,404,622 B2 | 3/2013 | Ghassemzadeh |
| 8,673,825 B2 | 3/2014 | Rayborn, Sr. et al. |
| 8,739,872 B1 | 6/2014 | Miller et al. |
| 8,776,882 B2 | 7/2014 | Shindgikar et al. |
| 8,887,808 B2 | 11/2014 | Kumar et al. |
| 8,935,957 B2 | 1/2015 | Kulkarni et al. |
| 8,992,670 B1 | 3/2015 | Vohra |
| 9,140,118 B2 | 9/2015 | Kulkarni et al. |
| 9,175,529 B2 | 11/2015 | Jamison et al. |
| 9,376,607 B2 | 6/2016 | James |
| 9,410,066 B2 | 8/2016 | Ghassemzadeh |
| 9,416,306 B2 | 8/2016 | Savari et al. |
| 9,453,156 B2 | 9/2016 | Wu |
| 9,505,659 B2 | 11/2016 | Bickbau |
| 9,592,488 B2 | 3/2017 | Yusuf et al. |
| 9,623,067 B1 | 4/2017 | Awad et al. |
| 9,688,901 B2 | 6/2017 | Fontenot |
| 9,783,727 B2 | 10/2017 | Lahman et al. |
| 2002/0010100 A1 | 1/2002 | Wood |
| 2004/0023813 A1 | 2/2004 | Burts, III |
| 2004/0129460 A1 | 7/2004 | MacQuoid et al. |
| 2004/0244978 A1 | 12/2004 | Shaarpour |
| 2005/0113260 A1 | 5/2005 | Wood |
| 2005/0124502 A1 | 6/2005 | Shaarpour |
| 2005/0217852 A1 | 10/2005 | Bennett et al. |
| 2006/0106136 A1 | 5/2006 | Abu-Sharkh |
| 2006/0122069 A1 | 6/2006 | Burts, III |
| 2006/0157247 A1 | 7/2006 | Burts, III |
| 2006/0160907 A1 | 7/2006 | Stamp |
| 2009/0054269 A1 | 2/2009 | Chatterji et al. |
| 2009/0286697 A1 | 11/2009 | Shaarpour |
| 2009/0305038 A1 | 12/2009 | Duran et al. |
| 2009/0305911 A1 | 12/2009 | Pomerleau |
| 2010/0152070 A1 | 6/2010 | Ghassemzadeh |
| 2010/0181110 A1 | 7/2010 | Harr |
| 2010/0193244 A1 | 8/2010 | Hoskins |
| 2010/0230164 A1 | 9/2010 | Pomerleau |
| 2010/0230169 A1 | 9/2010 | Pomerleau |
| 2011/0214870 A1 | 9/2011 | Shaarpour |
| 2011/0278006 A1 | 11/2011 | Sanders |
| 2012/0157354 A1 | 6/2012 | Li et al. |
| 2012/0247763 A1 | 10/2012 | Rakitsky et al. |
| 2013/0025863 A1 | 1/2013 | Lin et al. |
| 2014/0038857 A1 | 2/2014 | Miller et al. |
| 2014/0102987 A1 | 4/2014 | Yusuf et al. |
| 2014/0110177 A1 | 4/2014 | Harr |
| 2014/0135237 A1 | 5/2014 | Villarreal, Jr. et al. |
| 2014/0209290 A1 | 7/2014 | Jamison et al. |
| 2014/0231082 A1 | 8/2014 | Jamison et al. |
| 2014/0262281 A1 | 9/2014 | Kulkarni et al. |
| 2014/0318793 A1 | 10/2014 | Van Petergem et al. |
| 2014/0353043 A1 | 12/2014 | Amanullah et al. |
| 2015/0051120 A1 | 2/2015 | Hurd et al. |
| 2015/0072901 A1 | 3/2015 | Samuel et al. |
| 2015/0166875 A1 | 6/2015 | Bird et al. |
| 2015/0247081 A1 | 9/2015 | Dillon et al. |
| 2015/0251156 A1 | 9/2015 | Yusuf et al. |
| 2016/0060985 A1 | 3/2016 | Lin et al. |
| 2016/0096988 A1 | 4/2016 | Lin et al. |
| 2016/0177164 A1 | 6/2016 | Dillon et al. |
| 2016/0222274 A1 | 8/2016 | Hoskins |
| 2016/0222275 A1 | 8/2016 | Galindo et al. |
| 2016/0257869 A1 | 9/2016 | Kulkarni et al. |
| 2016/0264839 A1 | 9/2016 | Mata et al. |
| 2016/0289528 A1 | 10/2016 | Wagle et al. |
| 2016/0312100 A1 | 10/2016 | Amanullah et al. |
| 2017/0058180 A1 | 3/2017 | Hossain et al. |
| 2017/0137688 A1 | 5/2017 | Amanullah |
| 2017/0166795 A1 | 6/2017 | Walker et al. |
| 2017/0240791 A1 * | 8/2017 | Padua Oliveira ........ C09K 8/03 |
| 2017/0298263 A1 | 10/2017 | Amanullah |
| 2018/0002588 A1 | 1/2018 | Amanullah |
| 2018/0002589 A1 | 1/2018 | Amanullah |
| 2018/0016483 A1 | 1/2018 | Amanullah |
| 2018/0057729 A1 | 3/2018 | Amanullah |

FOREIGN PATENT DOCUMENTS

| | | |
|---|---|---|
| CN | 101724383 A | 6/2010 |
| CN | 102127403 A | 7/2011 |
| CN | 203035080 U | 7/2013 |
| CN | 103570298 A | 2/2014 |
| CN | 103740346 A | 4/2014 |
| CN | 104087274 A | 10/2014 |
| CN | 104419392 A | 3/2015 |
| CN | 105541159 A | 5/2016 |
| GB | 2506603 A | 4/2014 |
| JP | 0671171 A | 3/1994 |
| WO | 2004013448 A2 | 2/2004 |
| WO | 2010019535 A2 | 2/2010 |
| WO | 2010088484 A2 | 8/2010 |
| WO | 2010142370 A1 | 12/2010 |
| WO | 2012037600 A1 | 3/2012 |
| WO | 2012061187 A2 | 5/2012 |
| WO | 2013039938 A1 | 3/2013 |
| WO | 2014008598 A1 | 1/2014 |
| WO | 2014197417 A1 | 12/2014 |
| WO | 2015142156 A1 | 9/2015 |

(56) References Cited

FOREIGN PATENT DOCUMENTS

| WO | 2015199652 A1 | 12/2015 | | |
|---|---|---|---|---|
| WO | 2016019416 A1 | 2/2016 | | |
| WO | 2016028470 A1 | 2/2016 | | |
| WO | WO-2016028470 A1 * | 2/2016 | ............... | C09K 8/03 |
| WO | 2016172287 A1 | 10/2016 | | |
| WO | 2017087434 A1 | 5/2017 | | |
| WO | 2018005575 A1 | 1/2018 | | |

OTHER PUBLICATIONS

International Search Report and Written Opinion for International Application No. PCT/US2017/041611; International Filing Date Jul. 12, 2017; Report dated Oct. 27, 2017 (pp. 1-15).
International Search Report and Written Opinion for International Application No. PCT/US2018/048423; International Filing Date Aug. 29, 2018; Report dated Nov. 29, 2018 (pp. 1-12).
Alsaba, M. et al. "Review of lost circulation materials and treatments with an updated classification." AADE National Technical Conference and Exhibition, Houston, TX, Apr. 2014. pp. 1-9.
Amanullah "Characteristics, behavior and performance of ARC Plug-A date seed-based sized particulate LCM." SPE Kingdom of Saudi Arabia Annual Technical Symposium and Exhibition. Society of Petroleum Engineers, 2016. (pp. 1-9).
Amanullah, et al.: "Application of an indigenous eco-friendly raw material as fluid loss additive", Journal of Petroleum Science and Engineering, vol. 139, (2016) pp. 191-197.
BakerHughes.com "SOLUFLAKE Flaked Calcium Carbonate" (XP055401101) Jan. 8, 2016 (1 Page).
International Search Report and Written Opinion for International Application No. PCT/US2016/062130; Report dated Jan. 27, 2017 (pp. 1-12).
International Search Report and Written Opinion for International Application No. PCT/US2017/039614; Report dated Sep. 11, 2017; pp. 1-12.
International Search Report and Written Opinion for International Application No. PCT/US2017/039616; Report dated Sep. 11, 2017; pp. 1-11.
International Search Report and Written Opinion for International Application No. PCT/US2017/053355; International filing date Sep. 26, 2017; Report dated Jan. 17, 2018 (pp. 1-14).
International Search Report and Written Opinion for International Application No. PCT/US2017/060079; International Filing Date Nov. 6, 2017; Report dated Dec. 18, 2017 (pp. 1-14).
International Search Report and Written Opinion for PCT/US2017/047877; Report dated Oct. 27, 2017; 15 pages.
Wajheeuddin, M. et al. "An experimental study on particle sizing of natural substitutes for drilling fluid applications." Journal of Nature Science and Sustainable Technology 8.2 (2014): pp. 1-14.
International Search Report and Written Opinion for International Application No. PCT/US2017/027287; report dated Sep. 13, 2017; 11 pages.
Alawad, Musaed N.J., et al.; "Superior fracture-seal material using crushed date palm seeds for oil and gas well drilling operations" Journal of King Saud University—Engineering Sciences (2017); pp. 1-7.
Al-Awad, Musaed NJ et al.; "Utilization of Shredded Waste Car Tyres as a Fracture Seal Material (FSM) in Oil and Gas Drilling Operations" Journal of Petroleum & Environmental Biotechnology, (2017) vol. 8, Issue 2; pp. 1-4.
International Search Report and Written Opinion for International Application No. PCT/US2018/034291; International Filing Date May 24, 2018; Report dated Jul. 31, 2018 (pp. 1-11).
Saudi Aramco "Local pal trees support technical solutions" Dhahran, Aug. 4, 2015; available as of Sep. 19, 2018 at the website: www.saudiaramco.com/en/home/news-media/news/local-palm-trees-support.html.

* cited by examiner

FLAKY DATE FRUIT CAP FOR MODERATE TO SEVERE LOSS CONTROL

CROSS-REFERENCE TO RELATED APPLICATIONS

This application is a divisional of and claims priority from U.S. Non-Provisional application Ser. No. 15/436,116 filed Feb. 17, 2017, and titled "FLAKY DATE FRUIT QULANSUWA (CAP) FOR MODERATE TO SEVERE LOSS CONTROL," which claims priority from U.S. Provisional Application No. 62/356,858 filed Jun. 30, 2016, and titled "FLAKY DATE FRUIT QULANSUWA (CAP) FOR MODERATE TO SEVERE LOSS CONTROL," each of which are incorporated by reference in their entirety for the purposes of United States patent practice.

BACKGROUND

Field of the Disclosure

The present disclosure generally relates to controlling lost circulation in a wellbore during drilling with a drilling fluid. More specifically, embodiments of the disclosure relate to a lost circulation material (LCM).

Description of the Related Art

Lost circulation is one of the frequent challenges encountered during drilling operations. Lost circulation can be encountered during any stage of operations and occurs when drilling fluid (or drilling mud) pumped into a well returns partially or does not return to the surface. While some fluid loss is expected, excessive fluid loss is not desirable from a safety, an economical, or an environmental point of view. Lost circulation is associated with problems with well control, borehole instability, pipe sticking, unsuccessful production tests, poor hydrocarbon production after well completion, and formation damage due to plugging of pores and pore throats by mud particles. In extreme cases, lost circulation problems may force abandonment of a well.

Lost circulation can occur in various formations, such as naturally fractured formations, cavernous formations, and high permeable formations. Lost circulation can be categorized by the amount of fluid or mud lost and as seepage type, moderate type, severe type, and total loss. The extent of the fluid loss and the ability to control the lost circulation with an LCM depends on the type of formation in which the lost circulation occurs. Formations with low permeability zones, that is, those with microscopic cracks and fissures, usually have seepage type lost circulation. Other formations may experience lost circulation if an improper mud weight is used while drilling.

SUMMARY

Lost circulation materials (LCMs) are used to mitigate the lost circulation by blocking the path of the drilling mud into the formation. The type of LCM used in a lost circulation situation depends on the extent of lost circulation and the type of formation. Different types of loss control materials (LCMs) such as granular, fibrous and flaky materials are frequently used either alone or in combination to control loss of circulation. Costs incurred in loss circulation situations may be due to losses of drilling fluids, losses of production, and the costs of LCMs, including importation of LCMs to drilling locations, used in combating lost circulation. Additionally, lost circulation can cause environmental problems if drilling fluids or LCMs interact with the environment surrounding the reservoir. The manufacture, use, and disposal of some conventional LCMs may pose a risk to sensitive environments, such as marine environments because they are not biodegradable and can be toxic to marine life. Additionally, the purchase and importation of LCMs to drilling locations may be expensive and time-consuming.

In some embodiments, a method to control lost circulation in a lost circulation zone in a wellbore is provided. The method includes introducing an altered drilling fluid into the wellbore such that the altered drilling fluid contacts the lost circulation zone and reduces a rate of lost circulation into the lost circulation zone. The altered drilling fluid includes a drilling fluid and a lost circulation material (LCM). The LCM includes a plurality of date fruit caps. In some embodiments, the altered drilling fluid consists of the drilling fluid and the LCM. In some embodiments, the LCM consists of the plurality of date fruit caps. In some embodiments, the date fruit caps include a concentration of at least 10 pounds-per-barrel in the altered drilling fluid. In some embodiments, the date fruit caps include untreated date fruit caps, such that the untreated date fruit caps are not introduced to an alkali, an acid, a bleaching or an oxidation agent before forming the LCM. In some embodiments, the reduced rate of lost circulation of a mud portion of the altered drilling fluid is at least 80% less by volume than before introduction of the altered drilling fluid. In some embodiments, the reduced rate of lost circulation of a fluid portion of the altered drilling fluid is at least 80% less by volume than before introduction of the altered drilling fluid. In some embodiments, each of the plurality of date fruit caps has a diameter in the range of 7 millimeters (mm) to 8 mm. In some embodiments, each of the plurality of date fruit caps includes three flakes and, in some embodiments, each of the plurality of date fruit caps has a surface area in the range of 38 mm$^2$ to 50 mm$^2$ when the flakes are spread. In some embodiments, the LCM has a plugging efficiency greater than a flaked calcium carbonate LCM.

In some embodiments, an altered drilling fluid is provided that includes a drilling fluid and a lost circulation material (LCM that includes a plurality of date fruit caps. In some embodiments, the LCM consists of the plurality of date fruit caps. In some embodiments, the date fruit caps include a concentration of at least 10 pounds-per-barrel. In some embodiments, the plurality of date fruit caps includes a plurality of untreated date fruit caps. In some embodiments, each of the plurality of date fruit caps has a diameter in the range of 7 millimeters (mm) to 8 mm. In some embodiments, each of the plurality of date fruit caps includes three flakes and, in some embodiments, each of the plurality of date fruit caps has a surface area in the range of 38 mm$^2$ to 50 mm$^2$ when the flakes are spread.

In some embodiments, a method of forming an altered drilling fluid is provided. The method includes separating a plurality of date fruit caps from date fruits and isolating each of plurality of the date fruit caps from spikelets coupled to each date fruit cap to form a lost circulation material (LCM) that includes the plurality of date fruit caps. The method further includes adding the LCM to a drilling fluid to create an altered drilling fluid. In some embodiments, the drilling fluid is a water-based drilling fluid. In some embodiments, the LCM consists of the plurality of date fruit caps. In some embodiments, the plurality of date fruit caps include a plurality of untreated date fruit caps, such that the plurality of untreated date fruit caps are not introduced to an alkali, an acid, a bleaching or an oxidation agent before forming the LCM. In some embodiments, the date fruit caps include a concentration of at least 10 pounds-per-barrel in the altered drilling fluid. In some embodiments, the each of the plurality of date fruit caps has a diameter in the range of 7 millimeters (mm) to 8 mm. In some embodiments, each of the plurality of date fruit caps includes three flakes and, in some embodiments, each of the plurality of date fruit caps has a surface area in the range of 38 mm$^2$ to 50 mm$^2$ when the flakes are spread.

In some embodiments, a lost circulation material (LCM) composition is provided that includes a plurality of date fruit caps produced from date fruits. In some embodiments, the date fruit caps include untreated date fruit caps, such that the untreated date fruit caps are not introduced to an alkali, an acid, a bleaching or an oxidation agent before forming the LCM. In some embodiments, each of the plurality of date fruit caps has a diameter in the range of 7 millimeters (mm) to 8 mm. In some embodiments, each of the plurality of date fruit caps includes three flakes and, in some embodiments, each of the plurality of date fruit caps has a surface area in the range of 38 mm$^2$ to 50 mm$^2$ when the flakes are spread.

DETAILED DESCRIPTION

The present disclosure will now be described more fully with reference to the accompanying drawings, which illustrate embodiments of the disclosure. This disclosure may, however, be embodied in many different forms and should not be construed as limited to the illustrated embodiments set forth in the disclosure. Rather, these embodiments are provided so that this disclosure will be thorough and complete, and will fully convey the scope of the disclosure to those skilled in the art.

As a wellbore is drilled, a drilling fluid is continuously pumped into the wellbore to clear and clean the wellbore and the filings. The drilling fluid is pumped from a mud pit into the wellbore and returns again to the surface. A lost circulation zone is encountered when the flow rate of the drilling fluid that returns to the surface is less than the flow rate of the drilling fluid pumped into the wellbore, and it is this reduction or absence of returning drilling fluid that is referred to as lost circulation.

Embodiments of the disclosure include a date fruit cap LCM that includes date fruit caps to mitigate or prevent lost circulation in a well, as well as provide seepage control and minimize or prevent fluid loss. As used in the disclosure, the term date fruit cap may refer to or include the perianth of a date tree and may also be referred to as the "qulansuwa." The date fruit cap LCM includes date fruit caps having multiple flakes (for example, three flakes) attached at one end to an end cap and free at the other end to mitigate or prevent loss of circulation while drilling and cementing. The flakes provide unified flow barriers to the loss of drilling fluid while drilling or the loss of cement slurry while cementing a well.

In some embodiments, the date fruit cap LCM may include untreated date fruit caps. As used in the disclosure, the term "untreated" or "without treating" refers to not treated with alkali or acid, not bleached, not chemically altered, not oxidized, and without any extraction or reaction process other than possibly drying of water. The term "untreated" or "without treatments" does not encompass grinding or heating to remove moisture but does encompass chemical or other processes that may change the characteristics or properties of the LCM. In accordance with this definition, an LCM that is treated may behave in a manner different than its original starting material. In such embodiments, the date fruit caps may be manufactured without treating before, during, or after separation, cleaning, or any other processing.

Figure 1:
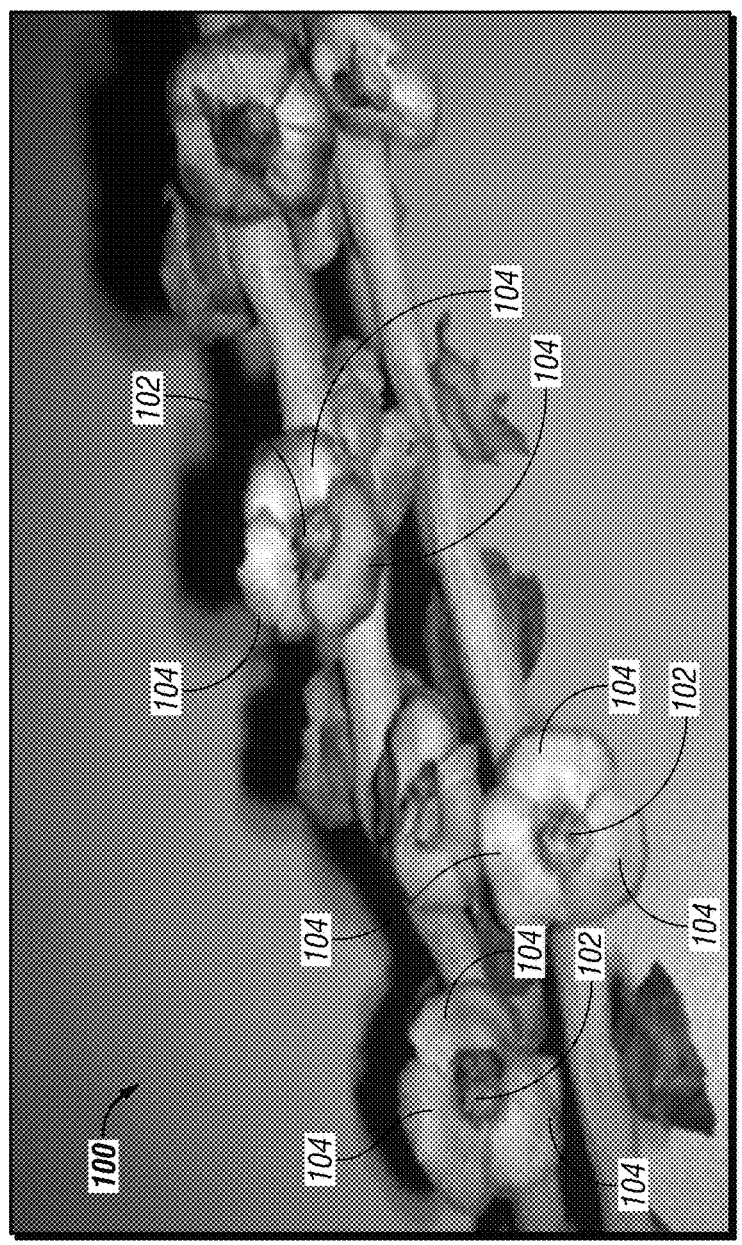
FIG. 1 is a photograph of date fruit caps having three flakes in accordance with an example embodiment of the disclosure.

FIG. 1 is a photograph 100 of date fruit caps 102 having three flakes 104 arranged in an overlapping floral pattern. One end of the flakes is attached to the spikelets of the date-bearing panicle (the panicle of the date fruit in FIG. 1 has been removed for clarity). The date fruit cap may bind and attach the date fruit to the spikelets of the panicle of the date tree to protect the date fruit and prevent its detachment until harvesting. In some embodiments, the date fruit cap may have a diameter in the range of about 7 millimeters (mm) to about 8 mm. In other embodiments, the date fruit cap may have a diameter less than 7 mm or greater than 8 mm. After spreading, in some embodiments the date fruit cap with flakes may cover a surface area in the range of about 38 mm$^2$ to about 50 mm$^2$. In other embodiments, the date fruit cap may have a surface area less than 38 mm$^2$ or greater than 50 mm$^2$. Thus, the date fruit cap LCM described in the disclosure may block or seal fractures having openings or flow channels close to the surface area coverage of the date fruit caps.

As previously noted, the three flakes 104 are connected at one end to an end cap and free at the other end. The free ends of the flakes 104 may provide for spreading and flattening of the umbrella-like unified multi-flake structure without losing the integrity of the end cap fortified flakes, as opposed to conventional flake LCMs that are unable to maintain integrity with flake spreading. Due the greater areal coverage, the date fruit cap LCM described in the disclosure has the capability to seal gaps and fractures of various sizes and to simultaneously seal multiple cracks and fractures.

Figure 2:
FIG. 2 is a photograph of date fruit caps of a date fruit cap LCM produced from the waste product of date tree and date fruit processing in accordance with an example embodiment of the disclosure.

The date fruit caps are obtained from date trees (also referred to as "date palms") used for the production of date fruits (also referred to as "dates"). FIG. 2 is a photograph 200 of date fruit caps of a date fruit cap LCM produced from the waste product of date tree and date fruit processing. Each fruit-bearing panicle obtained from a date tree may include hundreds of spikelets and thousands of date fruit caps, resulting in a relatively large and sustainable source of date fruit caps for use in the date fruit cap LCM described in the disclosure. In addition to the superior technical performance described in the disclosure, the eco-friendly, non-toxic, and environmentally friendly properties of the date fruit cap LCM may have superior environmental performance as compared to conventional flake LCMs. For example, the date fruit cap LCM described in the disclosure may meet or exceed environment regulations for drilling and cementing operations as compared to cellophane flake LCMs or other artificial flake LCMs.

EXAMPLES

The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure.

The following non-limiting examples of a date fruit cap LCM were prepared and evaluated against commercially available LCMs. Plugging efficiency tests were conducted on the date fruit cap LCM and commercially available LCMs using a 2 mm slotted disc and a Permeability Plugging Tester (also referred to as "PPT" or "Pore Plugging Test" apparatus) manufactured by OFI Testing Equipment, Inc., of Houston, Tex., USA. The tests were conducted at conditions of about 250° F. and about 1500 psi differential pressure. For the plugging efficiency tests, the date fruit cap LCM and commercially available LCMs were incorporated into a 65 pounds per cubic foot (pcf) bentonite mud. The composition of the 65 pcf bentonite mud with mud components expressed in pounds-per-barrels (lb/bbl or ppb) is shown in Table 1:

TABLE 1

| Composition of 65 pcf bentonite mud | |
|---|---|
| Mud Component | Lb/bbl |
| Water | 330.67 |
| Bentonite | 25.00 |
| Caustic Soda | 0.25 |
| Soda Ash | 0.25 |

The date fruit cap LCM and walnut LCM were tested using the Permeability Plugging Tester apparatus and the following plugging efficiency test procedure for each plugging efficiency test:

1. Set the temperature controller/thermostat to the testing temperature;
2. Check the condition of the O-rings in the groove at the top of the test cell of the Permeability Plugging Tester apparatus and in the cell end cap and replace the O-rings if needed;
3. Apply a thin coating of high temperature grease to all the O-rings, including the two O-rings on the piston of the Permeability Plugging Tester apparatus;
4. Screw the T-bar of the Permeability Plugging Tester apparatus into the piston, install into the bottom end of the test cell, position the piston about 1 inch into the cell bore, and remove the T-bar;
5. Add a volume of hydraulic oil to the test cell using the hydraulic hand pump of the Permeability Plugging Tester apparatus;
6. Install all the O-rings and secure the end cap of the cell in position such that oil flows from the hole in the end cap to ensure no air is trapped;
7. Install the valve stem into the bottom end cap of the cell, tighten the valve stem, and disconnect from the hydraulic hand pump of the Permeability Plugging Tester apparatus;
8. Place the cell upright on a suitable stand;
9. Pour a test sample of an homogenous mixture of bentonite mud and the LCM into the test cell;
10. Install an O-ring into the top of the cell below the 2 mm slotted disc;
11. Place the 2 mm slotted disc on top of the O-ring;
12. Insert the end cap on the top of the disc, screw down the threaded retaining ring, and fully tighten;
13. Tighten the top stem of the test cell;
14. Place the cell into the heating jacket of the Permeability Plugging Tester apparatus;
15. Connect a pressure hose from the hydraulic hand pump to the bottom of the test cell via a quick connector and ensure the bottom stem is closed;
16. Connect the back pressure hose/sample collector to the top stem of the test cell, ensuring that the locking pin is in place, close the pressure relief valve on the side of the hydraulic hand pump, apply the testing pressure via the back pressure regulator to the top of the test cell, and close the top valve.
17. Place a thermometer into the hole at the top of the test cell. wait until the testing temperature is reached, and monitor the cell pressure while heating and bleed off pressure if necessary by opening the pressure relived valve on the side of the hydraulic hand pump;
18. Once the test sample has reached the testing temperature, pump the hydraulic hand pump until the pump gauge shows the testing pressure plus the required back pressure;
19. Apply the required back pressure to the top of the cell, open the top valve, and pump the hydraulic hand pump to reestablish the testing pressure;
20. To determine the spurt volume, collect the fluid from the back pressure collector in a measuring cylinder and record the amount, ensuring that all the fluid has been expelled;
21. Collect the fluid periodically over a 30 minute time period and check the back pressure gauge to ensure that the testing pressure remains less than the pressure threshold (about 3000 psi) of the built-in safety disc of the Permeability Plugging Tester apparatus and avoid expulsion of hot hydraulic oil;
22. Record the spurt loss, total leak off, and PPT values over the 30 minute time period and record the cake thickness after dismantling the test cell.

Table 2 shows the results of the plugging efficiency tests for the date fruit cap LCM at the 10 pounds-per-barrel of the tested mud (ppb), 15 ppb, and 20 ppb concentrations in the 65 pcf bentonite mud, with the spurt loss, fluid loss, total leak off, and PPT value measured in cubic centimeters (cc) and the cake thickness measured in mm:

TABLE 2

| Plugging Efficiency Test Results for Date Fruit Cap LCM | | | | | | | |
|---|---|---|---|---|---|---|---|
| Mud | LCM | Concentration | Spurt loss (cc) | Fluid loss (cc) | Total Leak off (cc) | Cake Thickness (mm) | PPT Value (cc) |
| 65 pcf bentonite mud | Date fruit cap LCM | 10 ppb | 1.2 | 23 | 24.2 | N/A | 48.4 |
| 65 pcf bentonite mud | Date fruit cap LCM | 15 ppb | 0 | 0 | 0 | N/A | 0 |
| 65 pcf bentonite mud | Date fruit cap LCM | 20 ppb | 0 | 0 | 0 | N/A | 0 |

The date fruit cap LCM was tested against a first commercially available flaky acrylic gelatin LCM, referred to herein as "Gelflake." Table 3 shows the results of the plugging efficiency tests for Gelflake in the 65 pcf bentonite mud and the results of the plugging efficiency tests for the date fruit cap LCM at 10 ppb and 20 ppb concentrations in the 65 pcf bentonite mud:

TABLE 3

Plugging Efficiency Test Results for Commercially Available LCM and Date Fruit Cap LCM

| Mud | LCM | Concentration | Spurt loss (cc) | Fluid loss (cc) | Total Leak off (cc) | Cake Thickness (mm) | PPT Value (cc) |
|---|---|---|---|---|---|---|---|
| 65 pcf bentonite mud | Date fruit cap LCM | 10 ppb | 1.2 | 23 | 24.2 | N/A | 48.4 |
| 65 pcf bentonite mud | Date fruit cap LCM | 20 ppb | 0 | 0 | 0 | N/A | 0 |
| 65 pcf bentonite mud | Gelflake | 10 ppb | 9 | 215 | 225 | N/A | 448 |
| 65 pcf bentonite mud | Gelflake | 20 ppb | 17 | 197 | 214 | N/A | 428 |

As shown in Table 3, the 10 ppb concentration of the date fruit cap LCM stopped the loss of the whole bentonite mud but allowed some losses of the fluid phase from the mud similar to normal filtrate loss in a permeable formation. The 10 ppb concentration of the date fruit cap LCM thus demonstrates the ability to prevent the loss of whole mud through fractured loss zones having about 2 mm sized fractures in the rock matrix.

As also in Table 3, the 20 ppb concentration of the date fruit cap LCM exhibited no loss of whole mud and no loss of the fluid phase of the tested bentonite mud system, as indicated by the zero spurt loss, zero fluid loss, zero total leak off, and zero PPT value shown in Table 2. In contrast, as shown in Table 2, the 10 ppb and 20 ppb of Gelflake exhibited an inability to prevent the loss of whole mud and the loss of the fluid phase.

The date fruit cap LCM was also tested against a commercially available flaked calcium carbonate LCM, Soluflake™ manufactured by Baker Hughes of Houston, Tex., USA. Table 4 shows the results of plugging efficiency tests for Soluflake™ in the 65 pcf bentonite mud and the results of the plugging efficiency tests for the date fruit cap LCM at 20 ppb concentrations in the 65 pcf bentonite mud:

TABLE 4

Plugging Efficiency Test Results for Commercial LCM and Date Fruit Cap LCM

| Mud | LCM | Concentration | Spurt loss (cc) | Fluid loss (cc) | Total Leak off (cc) | Cake Thickness (mm) | PPT Value (cc) |
|---|---|---|---|---|---|---|---|
| 65 pcf bentonite mud | Date fruit cap LCM | 20 ppb | 0 | 0 | 0 | N/A | 0 |
| 65 pcf bentonite mud | Soluflake ™ | 20 ppb | 12 | 208 | 220 | N/A | 430 |

Here again, as shown in Table 4, the 20 ppb concentration of the date fruit cap LCM exhibited no loss of whole mud and no loss of the fluid phase of the tested bentonite mud system, as indicated by the zero spurt loss and zero fluid loss shown in Table 3. In contrast, as shown in Table 4, the 20 ppb of Soluflake™ exhibited an inability to prevent the loss of whole mud and the loss of the fluid phase.

The date fruit cap LCM was also tested against a commercially available cellulosic fiber and flake LCM, STOPLOSS® manufactured by Drilchem of Jakarta, Indonesia. Table 5 shows the results of plugging efficiency tests for STOPLOSS® in the 65 pcf bentonite mud and the results of plugging efficiency tests for the date fruit cap LCM at the 10 ppb, 15 ppb, and 20 ppb concentrations in the 65 pcf bentonite mud:

TABLE 5

Plugging Efficiency Test Results for Commercial LCM and Date Fruit Cap LCM

| Mud | LCM | Concentration | Spurt loss (cc) | Fluid loss (cc) | Total Leak off (cc) | Cake Thickness (mm) | PPT Value (cc) |
|---|---|---|---|---|---|---|---|
| 65 pcf bentonite mud | Date fruit cap LCM | 10 ppb | 1.2 | 23 | 24.2 | N/A | 48.4 |
| 65 pcf bentonite mud | Date fruit cap LCM | 15 ppb | 0 | 0 | 0 | N/A | 0 |
| 65 pcf bentonite mud | Date fruit cap LCM | 20 ppb | 0 | 0 | 0 | N/A | 0 |
| 65 pcf bentonite mud | STOPLOSS ® | 10 ppb | 0 | 0 | 0 | N/A | 0 |

As shown in Table 5, the 15 ppb and 20 ppb concentration of the date fruit cap LCM show plugging efficiency performance comparable to the STOPLOSS® commercial LCM. Here again, as shown in Table 5, the 10 ppb concentration of the date fruit cap LCM exhibited no loss of whole mud but allowed some losses of the fluid.

Thus, as shown in Tables 2-5, the date fruit cap LCM may achieve no loss of whole mud and, in some concentrations, no losses of the fluid phase from the mud. The loss of the fluid phase from the mud may depend on the concentration of date fruit cap LCM. At concentrations of 15 ppm or greater in the tested 65 pcf bentonite mud, the date fruit cap LCM may achieve no loss of whole mud and no losses of the fluid phase from the mud. The ability of the date fruit cap LCM to achieve no loss of whole mud and no losses of the fluid phase of the mud may depend on the concentration of the date fruit cap LCM in the mud system. Thus, in some embodiments, the concentration of date fruit cap LCM in the mud system may be increased to ensure no loss of whole mud and no losses of the fluid phase of the mud.

Date Fruit Cap LCM Manufacture and Use

In some embodiments, a date fruit cap LCM may be composed of date fruit caps from the date tree. The date fruit caps may be produced as a waste by-product from date processing, and the date fruit caps may be obtained from date processing plants to provide sustainable source of material for the date fruit cap LCM. Moreover, local sources of date fruit caps may reduce the cost of imported LCM products, components, or both. In some embodiments, the date fruit caps may be obtained from the species *Phoenix dactylifera*. It should be appreciated that, in some embodiments, the date fruit caps may be obtained from genetically modified date trees (that is, genetically modified organisms (GMOs)). In some embodiments, the date fruit caps are prepared by cleaning the caps before use as an LCM, such as by blowing air over the caps to remove dust, dirt, and other materials.

In some embodiments, the date fruit caps may include untreated date fruit caps, thus preserving the environmentally-friendly and biodegradable properties of the manufacturing process, the fibers, and the resulting LCM composition. As used in the disclosure, the term "untreated" or "without treating" refers to not treated with alkali or acid, not bleached, not chemically altered, not oxidized, and without any extraction or reaction process other than possibly drying of water. The term "untreated" or "without treatments" does not encompass grinding or heating to remove moisture but does encompass chemical or other processes that may change the characteristics or properties of the fibers. In such embodiments, the date fruit caps may be manufactured without treating before, during, or after drying or any other processing.

In some embodiments, the date fruit cap LCM may be added directly to a drilling fluid, such as a drilling mud, to create an altered drilling fluid having the date fruit cap LCM. For example, in some embodiments, the date fruit cap LCM may be added to (for example, blended with) an oil-based drilling mud or a water-based drilling mud. In some embodiments, the date fruit cap LCM may be added at the mud pit of a mud system. After addition of the date fruit cap LCM to a drilling fluid, the altered drilling fluid may be circulated at a pump rate effective to position the altered drilling fluid into contact with a lost circulation zone in a wellbore, such that the date fruit cap LCM alters the lost circulation zone (for example, by entering and blocking porous and permeable paths, cracks, and fractures in a formation in the lost circulation zone, such as forming a plug in a fracture).

As noted in the disclosure, the mechanical properties of the date fruit cap LCM may prevent degradation of the date fruit cap LCM while circulating downhole as a fluid loss additive or formation strengthening material. Moreover, the eco-friendly, non-toxic, and environmentally friendly properties of the date fruit cap LCM may minimize or prevent any environmental impact, any effect on ecosystems, habitats, population, crops, and plants surrounding the drilling site where the date fruit cap LCM is used.

Figure 3:
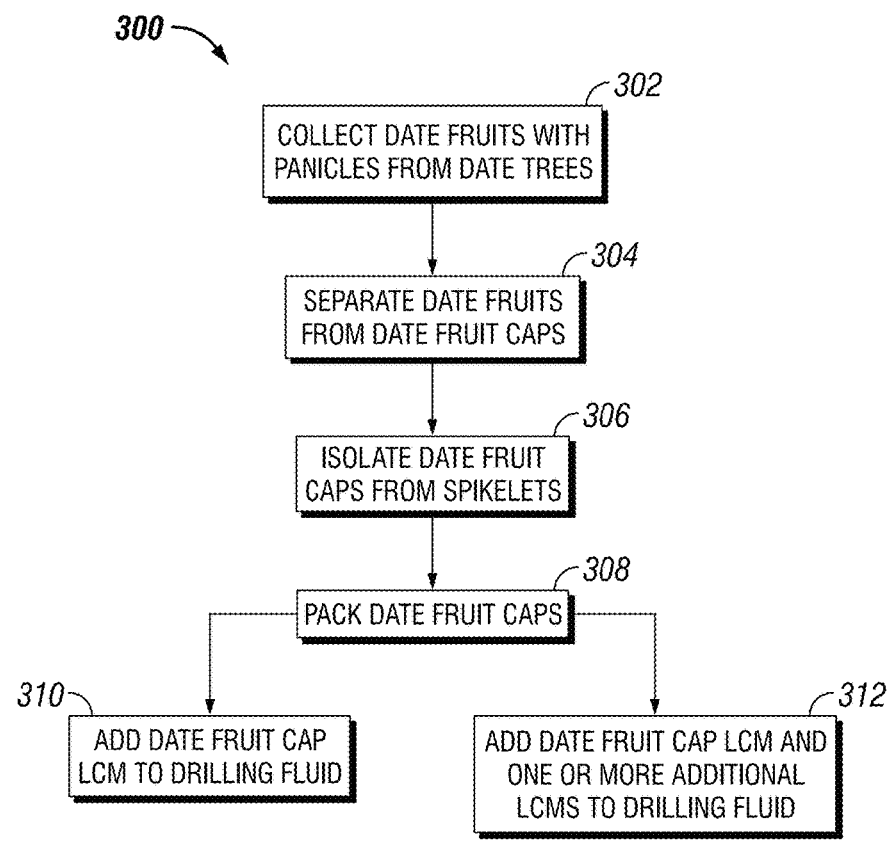
FIG. 3 is a flowchart of a process for producing and using a date fruit cap LCM in accordance with an example embodiment of the disclosure.

FIG. 3 depicts a process 300 for producing and using a date fruit cap LCM in accordance with an example embodiment of the disclosure. Initially, date fruits having panicles may be collected from date trees (block 302). The date fruits may be separated from the date fruit caps (block 304). Next, the date fruit caps may be isolated from the spikelets attached to the date fruit caps (block 306). In some embodiments, the separation, isolation, or both of the date fruit caps may be performed manually using a comb or fork-like tool. In some embodiments, the separation, isolation, or both of the date fruit caps may be performed automatically using a commercial scratching tool having a suitable speed regulation and tooth spacing for the separation, isolation, or both. In some embodiments, the date fruit caps may be cleaned, such as by blowing air over the caps to remove dust, dirt, and other materials.

The date fruit caps may then be packed (block 308) for transportation and use. For example, the date fruit caps may be packed in paper bags containing about 25 kilograms (kg) of date fruit caps. In some embodiments, for example, a suitable amount of date fruit caps may be transported to an oil and gas operations site for use as an LCM. In some embodiments, the date fruit cap LCM may be added directly to a drilling fluid (block 310), such as a drilling mud, to create an altered drilling fluid having the LCM. For example, in some embodiments, the date fruit cap LCM may be added to (for example, blended with) an oil-based drilling mud or a water-based drilling mud. In some embodiments, the date fruit cap LCM may be added at the mud pit of a mud system. After addition of the date fruit cap LCM to a drilling fluid, the altered drilling fluid may be circulated at a pump rate effective to position the drilling fluid into contact with a lost circulation zone in a wellbore, such that the date fruit cap LCM alters the lost circulation zone (for example, by entering and blocking porous and permeable paths, cracks, and fractures in a formation in the lost circulation zone). In some embodiments, the reduced rate of lost circulation may be about 80%. In some embodiments, the reduced rate of lost circulation may be negligible.

In some embodiments, the date fruit cap LCM and one or more additional LCMs may be added to a drilling fluid (block 312), such as a drilling mud, to create an altered drilling fluid having the LCMs. For example, in some embodiments, the date fruit cap LCM and one or more additional LCMs may be added to an oil-based drilling mud or a water-based drilling mud. In other embodiments, the date fruit cap LCM may be added to a cement slurry for use in a cementing operation.

The biodegradation properties of the date fruit cap LCM may enable the date fruit cap LCM to easily degrade and disappear from the environment over time and minimize or prevent any environmental impact. Further, the non-toxic properties of the date fruit cap LCM may minimize or prevent any effect on ecosystems, habitats, population, crops, and plants surrounding the drilling site where the date fruit cap LCM is used.

In some embodiments, the date fruit cap LCM may be mixed with a carrier fluid, a viscosifier, or both. In some embodiments, a date fruit cap LCM homogenous suspension or pill may be formed. For example, a specific carrier fluid, viscosifier, or combination therefor may be selected to form a homogenous suspension or pill having the date fruit cap LCM. In some embodiments, the carrier fluid may be water or an oil-based fluid. In some embodiments, the carrier fluid may be fresh water, sea water, salt water, diesel oil, mineral oil, or synthetic oil. In some embodiments, the viscosifier may be a clay or a polymer. Next, the homogenous suspension may be added to a drilling fluid and used in the manner similar to the date fruit cap LCM described in the disclosure.

Ranges may be expressed in the disclosure as from about one particular value, to about another particular value, or both. When such a range is expressed, it is to be understood that another embodiment is from the one particular value, to the other particular value, or both, along with all combinations within said range Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. An altered drilling fluid, comprising:
    a drilling fluid, wherein the drilling fluid comprises a bentonite mud comprising water, bentonite, caustic soda, and soda ash; and
    a lost circulation material (LCM), wherein the LCM consists of a plurality of whole date fruit caps, wherein the whole date fruit caps comprise a concentration of at least 20 pounds-per-barrel, wherein each of the plurality of date fruit caps has a diameter in the range of 7 millimeters (mm) to 8 mm and each of the plurality of date fruit caps comprises three flakes, wherein each of the plurality of date fruit caps has a surface area in the range of 38 $mm^2$ to 50 $mm^2$ when the flakes are spread.

2. The altered drilling fluid of claim 1, wherein the plurality of whole date fruit caps comprise a plurality of untreated date fruit caps, wherein the untreated date fruit caps are not introduced to an alkali, an acid, a bleaching or an oxidation agent before forming the LCM.

* * * * *